Aug. 16, 1932.                L. A. PARADISE                1,872,042
                           AGRICULTURAL IMPLEMENT
                            Filed April 11, 1930
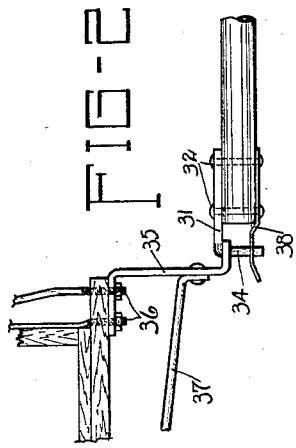
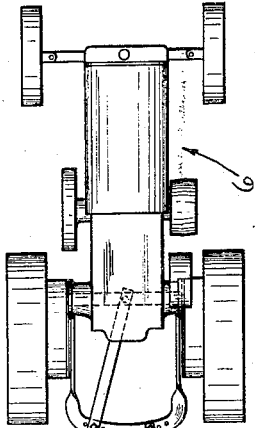
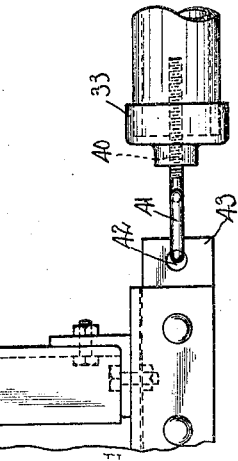
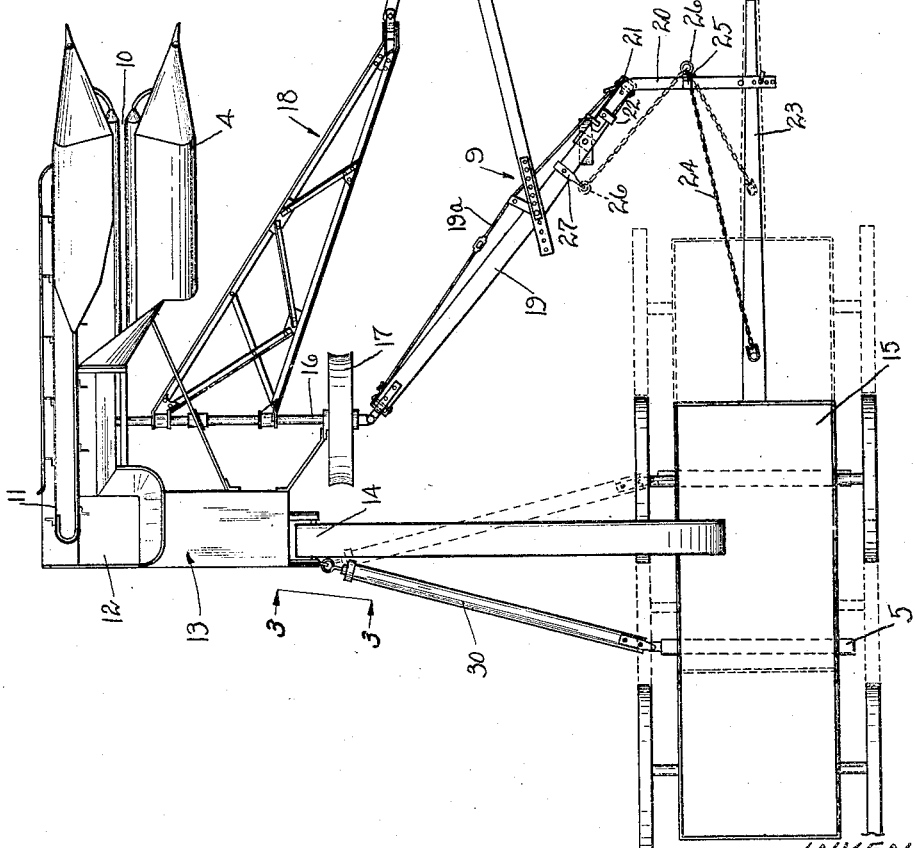
INVENTOR
Louis A. Paradise
BY
O. C. Bopf ATTORNEY
WITNESS
Walter Ackerman Patented Aug. 16, 1932

1,872,042

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

AGRICULTURAL IMPLEMENT

Application filed April 11, 1930. Serial No. 443,369.

This invention relates to agricultural implements in general, but more particularly to draft connections for hitching an agricultural implement and a wagon to a tractor and for maintaining the implement and wagon in proper spaced relationship.

It is known to provide draft connections of the character referred to which comprise a diagonally disposed beam connecting the draft member of the implement to the tongue of the wagon. Draft connections of this general type are disclosed in the copending application of Wilbur J. Coultas and Carl Frederiksen for draft connections filed July 8, 1929, Serial No. 376,561. The instant invention is in the nature of an improvement over the draft connection disclosed in the copending application referred to.

In the draft connections of this general character with which I am familiar, the diagonal beam is connected either to the frame structure or the draft frame of the implement, and as a result extends across the path of the inside carrying wheel, and in most instances in close proximity to the wheel. In this position, trouble is sometimes had particularly when operating in a muddy field by soil adhering to the wheel and building up to the point where it strikes against the diagonal beam. In such cases the beam begins to act as a brake which makes it necessary to stop operation and clean the wheel.

One of the functions of the diagonal beam is to transmit side thrust against the machine to counteract the side draft on the tractor due to the fact that the implement is offset with respect to the tractor. In prior draft connections, being connected either to the frame of the implement or its draft tongue, this force is required to act through members of the frame of the implement or members of the tongue necessitating special design to receive this thrust.

One of the main objects of this invention is to provide a draft connection in which the diagonal beam instead of being connected to a portion of the frame of the implement or to its draft tongue is connected to the axle outside of the inner carrying wheel. By reason of its connection with the implement at this point, it is not in a position where it can act as a brake in case the inner wheel builds up with mud, and the thrust transmitted by the beam is delivered directly to the axle of the carrying wheel.

In draft connections of this general type the wagon being pulled alongside the implement has been guided in this lateral position beside the implement merely by connection to the tongue of the wagon. While this serves to keep the wagon spaced a fixed distance from the implement when operated on level ground, I find that the wagon may not remain at a fixed distance from the implement when working on hillsides and in slippery soil conditions. In such cases, the wagon is very apt to skid either closer to or farther away from the implement.

It is a further object of my invention to provide a spacer between the implement and the wagon to positively hold the wagon a fixed distance from the implement and prevent the wagon from skidding either closer to or farther away from the implement.

In the draft connection shown in the copending application referred to above, means have been provided for pulling the wagon beside the implement in either of two longitudinal positions. A particular feature of my invention relating to the spacer is that no disconnection thereof need be made when the wagon is shifted from one longitudinal position to the other, and yet the wagon will be held at substantially the same distance from the implement in either position. I accomplish this by pivotally connecting the spacer to the wagon at a point a distance forward from the transverse plane passing through the point of connection of the spacer with the implement when the wagon is in the forward one of its two longitudinal positions, a distance equal to half the distance between the two positions that the wagon may take. The spacer therefore extends laterally from the implement and forwardly when the wagon is in its foremost position, and extends laterally from the implement and rearwardly when the wagon is in its rearmost position, with the angles between the spacer and the longitudinal plane passing through the point of connection of the spacer with the implement substantially equal.

Another object of my invention is to provide a spacer the effective length of which may be readily adjusted.

In order to acquaint those skilled in the art with the manner of construction and using my invention, I have described one specific embodiment thereof in connection with the accompanying drawing in which;

Figure 1 is a top view showing a single row corn picker and a wagon being drawn beside it by a tractor, the wagon being held a fixed distance from the implement in accordance with my invention;

Figure 2 is an enlarged fragmentary view showing the manner in which the spacer is pivotally connected to the wagon; and, Figure 3 is an enlarged detail view showing the manner in which the spacer is connected to the implement.

In the drawing, 4 indicates a single row corn picker, 5 a wagon, and 6 a tractor, the tractor drawing the corn picker through a drawbar 7 and drawing the wagon through the draft link 8 comprising one element of the draft connection 9 between the wagon and the corn picker. The corn picker 4 is indicated more or less diagrammatically as having a pair of picking or snapping rolls 10 which remove the ears of corn from the stalks, an elevator 11 which conveys the corn from the snapping rolls 10 into the hopper 12 from where the ears are lead into a husking mechanism 13. The husking mechanism removes the husks and delivers the ears into the elevator 14 which conveys the ears into the wagon box 15 of the wagon 5. The corn picker 4 is mounted on a framework which is supported on a transverse axle 16. Two carrying wheels 17 are journaled on the ends of axle 16, the outer one of which is hidden underneath the elevator. Draft is applied to the corn picker through the draft frame 18 which is pivoted at its rear end to the axle 16 and extends forwardly and at an angle for connection with the drawbar 7.

The draft connection 9 is substantially like that shown in the copending application referred to above. It comprises a diagonal beam 19 reinforced by a truss rod 19a. Pulling force is applied to the diagonal beam 19 through the draft link 8 which is pivotally connected to beam 19 intermediate the ends of the latter. At its forward end, an extension member 20 is provided comprising two similar arms pivoted at 21 to opposite sides of beam 19. Member 20 is prevented from rotating clockwise beyond the position shown in Fig. 1 by means of a U-shaped bracket 22 which bears against the rear edge of beam 19 and is fixed to the two rearwardly extending portions of the arms comprising the extension member. Member 20 may be swung forwardly to afford better access to the tongue of the wagon when a team of horses is to be hitched thereto. The tongue 23 of the wagon is supported between the two arms of member 20 and draft is applied to the wagon through a chain 24. Chain 24 is adapted to be fastened to the rear portion of the wagon tongue 23 as by means of a king bolt. Chain 24 passes up through an eye 25 carried by the extension member 20 and at its end is provided with a ring 26. When the wagon is to be pulled in its forwardmost position, ring 26 is hooked into an eye formed on bracket 27 carried on the center portion of beam 19. When the wagon is to be dropped back to its rearmost position, ring 26 is unhooked and the chain pulled through the eye 25 until it is stopped by the ring 26 which is too large to pass through the eye 25.

The rear end of beam 19 instead of being pivotally connected to the frame of the picker 4 or to the draft tongue 18 as is shown in the copending application referred to above, is pivotally connected by suitable means to the inner end of axle 16 beyond the inner carrying wheel 17. In this position it transmits thrust directly to the axle 16 and is in a position where it cannot interfere with the free rotation of the wheel 17 irrespective of how much mud may build up upon it.

The wagon is held a fixed distance from the implement in either of its two positions by means of a spacer 30. This spacer comprises a pipe having a bracket 31 riveted to one end by means of rivets 32, and a cap 33 threaded or otherwise secured thereto on the other end. Bracket 31 has a cylindrical depending portion 34 which is hooked into a perforation in the depending bracket 35 supported from the wagon box 15 by means of the braces 36 and 37. A leaf spring 38 is riveted to the under side of spacer 30 by means of rivets 32 and has an elongated perforation in its free end for receiving the end of hook 34. Spring 38 serves to prevent the hook 34 from being drawn out of the perforation in bracket 35 accidentally, but has sufficient resilience so that it may be forced free of the hook 34 by bearing upwardly on spacer 30 when the same is to be disconnected from the wagon.

Cap 33 has a central threaded longitudinal opening 40 into which is threaded an eyebolt 41. The eye of bolt 41 loops through a perforation 42 in bracket 43 extending laterally from and fixed rigidly to the rear portion of the frame of the corn picker.

In operation, the wagon is initially positioned in its foremost longitudinal position, so as to fill the rear portion of the wagon. To place the wagon in its rearmost longitudinal position, the ring 26 is merely unhooked from the bracket 27. The wagon drops back with the continued forward advance of the tractor and implement until the ring 26 is stopped at the eye 25. In changing the position of the wagon, no attention need be paid to the spacer 30, and no disconnection thereof with the wagon need be made. Since the angles that the spacer 30 makes with respect to the longitudinal plane passing through the point of connection of the spacer with the implement in the two positions of the wagon are substantially equal, the wagon will be held substantially the same distance from the implement in both positions. I prefer to connect the spacer to the wagon so that these angles are less than 30° so that the arc generated by the spacer in moving from one position to another does not depart appreciably from a straight line. As a result no appreciable side thrust is placed against the wagon as the implement moves forwardly with respect to the wagon as the wagon drops back to its rearmost position. Furthermore, with these angles less than 30°, the angles need not be exactly equal and yet the wagon will be held substantially the same distance from the implement in both longitudinal positions.

What I claim and desire to have protected by Letters Patent is:—

1. The combination of a harvesting implement adapted to be drawn by a tractor, a wagon, means for drawing the wagon beside the implement in a given laterally spaced relationship with the implement and in either of two longitudinal positions with respect to the implement, and a spacer pivoted to the implement at one end, and pivoted to the wagon at the other end at a point so that the angles between the spacer and the transverse plane passing through the point of connection of the spacer with the implement in the two positions of the wagon are substantially equal.

2. The combination of a harvesting implement adapted to be drawn by a tractor, a wagon, means for drawing the wagon beside the implement in a given laterally spaced relationship with the implement and in either of two longitudinal positions with respect to the implement, and a spacer pivoted to the implement at one end, and pivoted to the wagon at the other end at a point a distance from the transverse plane passing through the point of connection of the spacer with the implement substantially equal to half the distance between the longitudinal positions of the wagon, when the wagon is in either longitudinal position.

3. In a draft connection between a tractor and an agricultural implement carried on a transverse wheel supported axle and positioned back of and offset to one side of the tractor and a wagon disposed alongside of the implement and offset to the other side of the tractor, a draft member connecting the tractor and the implement, and a diagonal structure connecting the wagon with the axle of the implement outside of the carrying wheel adjacent the wagon, whereby the side draft of the wagon exerts a side pressure against the implement through the axle thereof to counteract the side draft of the implement.

4. In a draft connection between a tractor and an agricultural implement having a wheel supported axle and positioned back of and offset to one side of the tractor and a wagon disposed alongside of the implement and offset to the other side of the tractor, a draft member connecting the tractor and the implement, a diagonal structure connecting the wagon with the axle of the implement outside of the supporting wheel adjacent the wagon whereby the side draft of the wagon exerts a side pressure against the implement through the axle thereof to counteract the side draft of the implement, a link connecting said structure to the tractor, and a rigid spacer pivotally connected at one end to the frame of the implement rearwardly of the axle and at the other end to the wagon.

5. In combination, a tractor, a harvesting implement carried on a transverse wheel supported axle and positioned back of and offset to one side of the tractor, a wagon disposed alongside of the implement and offset to the other side of the tractor, said wagon having a tongue, a forwardly and laterally extending draft frame connected to the implement and pivotally connected to the rear of the tractor, a forwardly and laterally extending draft beam pivotally connected to the axle of the implement and slidably connected to the tongue of the wagon, a link pivotally connected to the rear of the tractor and to said beam intermediate the ends thereof, means for connecting the wagon to said beam in either of the two fore and aft positions, and a spacer pivoted to the implement at one end and pivoted to the wagon at the other end for preventing the wagon skidding toward or away from the implement, the connecting points being so related that the angles between the spacer and the transverse plane passing through the point of connection of the spacer with the implement in the two fore and after positions of the wagon are substantially equal whereby the wagon is maintained in longitudinal alinement with the forward end of said beam in either fore and aft position of the wagon, said beam functioning to transmit the lateral component of the draft of the wagon directly to the axle of the implement to counteract the side draft of the implement.

In witness whereof, I hereunto subscribe my name this 7th day of April, 1930.

LOUIS A. PARADISE.